Figure 1:
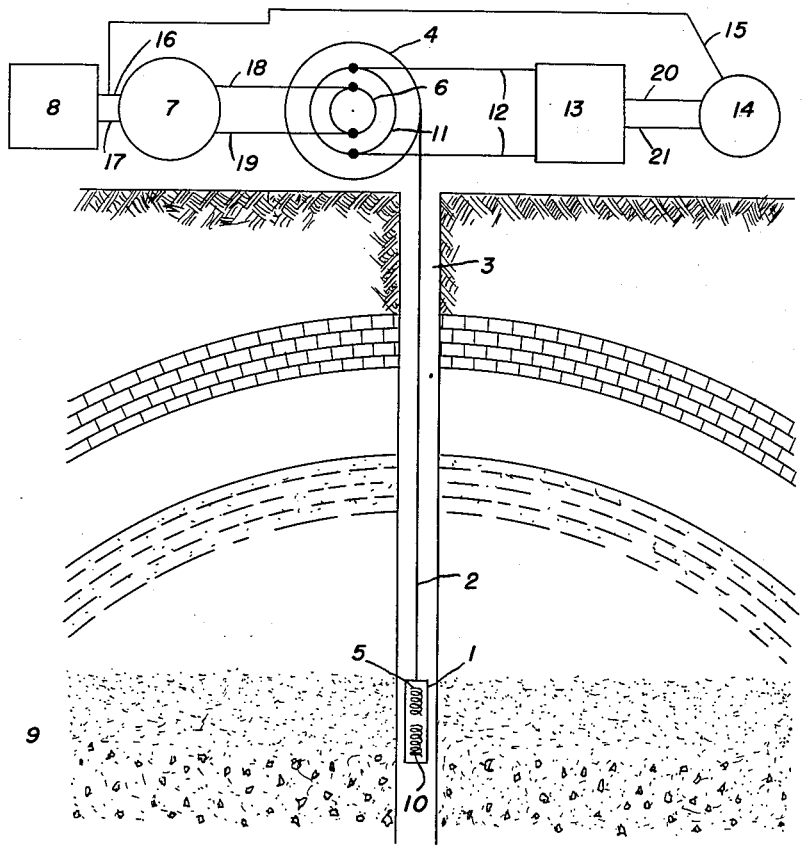

May 8, 1962 H. A. SLACK ETAL 3,034,042
METHOD OF DETERMINING VARIATION OF FORMATION RESISTIVITY
WITH DISTANCE FROM BOREHOLE BY MEANS
OF INDUCTION LOGGING
Filed Sept. 30, 1958

INVENTORS
HOWARD A. SLACK
GLENN A. MARSH

BY

ATTORNEY

United States Patent Office 3,034,042
Patented May 8, 1962

3,034,042
METHOD OF DETERMINING VARIATION OF FORMATION RESISTIVITY WITH DISTANCE FROM BOREHOLE BY MEANS OF INDUCTION LOGGING
Howard A. Slack and Glenn A. Marsh, Crystal Lake, Ill., assignors to The Pure Oil Company, Chicago, Ill., a corporation of Ohio
Filed Sept. 30, 1958, Ser. No. 764,369
8 Claims. (Cl. 324—6)

This invention relates to the logging of boreholes penetrating subterranean formations, and, more particularly, to a method of applying induction logging to the formations adjacent a borehole through variations in induction current to determine the existence of those formations which contain hydrocarbons capable of being displaced by mud filtrate and, as such, of being potentially recoverable in economic quantities.

Campbell and Martin, in their article entitled "Displacement Logging—a New Exploratory Tool", J. Pet. Tech., Tech. paper 4178, 204, 233, December 1955, show that a knowledge of the variation of formation resistivity with distance from the borehole can be used to determine the presence or absence of displaceable hydrocarbons in the formation. Knowledge of this kind may also be useful in determining the wettability of a given formation. These methods give a plot of the variation of formation resistivity with distance from the borehole by a series of estimates of the formation resistivity at different radii of current penetration corresponding to different electrode spacings. A plurality of power electrodes is used to obtain this information simultaneously. However, it is recognized that logging by the use of current electrodes is subject to certain limitations, the most significant being the complexity of interpretation and corrections of such logs.

In the prior methods of induction logging, an electrical current, flowing in a circular path around and coaxial with the center of the borehole, is induced in the formation. A transmitter coil within the borehole provides the initial magnetic field passing through the formation and there is also created a plurality of eddy currents around the paths of flow of the magnetic field. A secondary magnetic field is created by the eddy currents. This secondary magnetic field is detected and measured by a receiver coil also contained in the borehole. In these determinations, the accuracy of the measurements depends on the magnitude of the secondary magnetic field and its proportionality to the magnitude of the induced eddy current. The latter, in turn, is dependent on the conductivity or resisitivity of the formation.

In accordance with this invention, the depth of penetration of the ring of eddy currents within the formation is varied and controlled by changing the magnitude of the alternating current in the transmitter coil; this results in a measured change in the signal or receiver current, giving a direct indication of the variation of average formation resistivity with distance from the borehole. The method of this invention constitutes an improvement over the prior art methods in that the results obtained are more easily interpreted and are not subject to correctional factors.

Accordingly, it becomes a primary object of this invention to provide a method of determining the presence or absence of displaceable hydrocarbons in a subterranean formation.

A further object of the invention is to provide a method of induction logging based on applying an input ring of eddy currents of varied depth of penetration and detecting proportional changes in the receiver current as a direct indication of the presence of replaceable hydrocarbons.

Another object of the invention is to provide a method for determining the presence or absence of mud-displaceable hydrocarbons in a given formation by varying the power applied to the input transmitter coil of an induction logging apparatus over a predetermined range to thereby vary the depth of penetration of the eddy currents from the borehole and produce corresponding secondary magnetic fields which are picked up by a receiver and plotted to give a direct pattern of the resistivity of the formation at varying distances from the borehole.

A still further object of this invention is to provide a method of borehole logging wherein the corresponding secondary magnetic fields generated by an induction logging device are moved vertically within the formation to produce a vertical as well as a horizontal log by means of such variation in power input at the transmitter.

Another object of the invention is to provide a method of well-bore logging to detect the presence of displaceable hydrocarbons in a subterranean formation wherein the magnitude of the power to the input transmitter of an induction logging device is varied over a predetermined range, either continuously, intermittently, or step-wise, in a repetitive or cyclic manner, as the transmitter or sonde is continuously raised or lowered in an earth bore at a constant, relatively slow rate, and the response on the receiver is recorded automatically without the necessity of plotting individual points.

Figure 2:
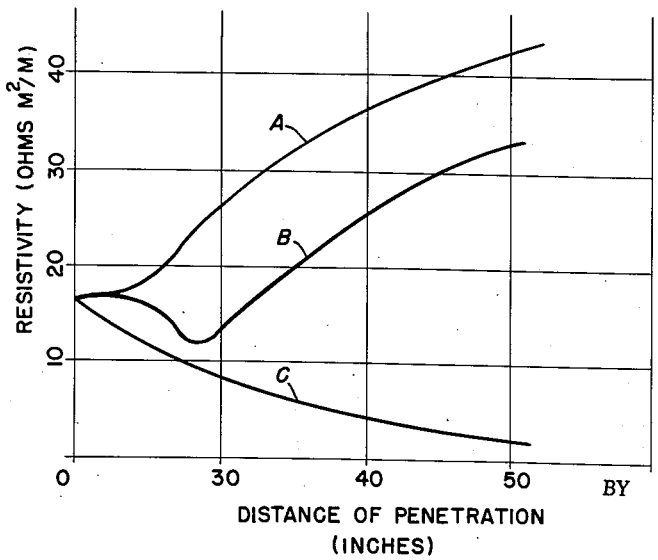

The invention is best explained by reference to the drawings wherein,

FIGURE 1 is a diagrammatic representation of a borehole, and the immediately surrounding environment of earth formation penetrated by the borehole, with a preferred embodiment of the apparatus suspended in working relationship therein, and FIGURE 2 is a representation of portions of typical graphic records which may be obtained by utilizing the apparatus and method of the present invention.

Where connate water is present in a subterranean formation, drilling a borehole using drilling mud causes the mud filtrate, i.e., the fluid portion of the mud, to penetrate the formation in the vicinity of the borehole. This causes the formation fluids to be forced back into the formation to a depth proportionate to the penetration. Any displaceable fluids present in the formation are forced into a concentrated zone at the leading edge of the mud filtrate. By measuring the specific resistivity of the formation in relation to the radial distance from the borehole, there is detected: (1) a first zone, exhibiting a resistivity which is primarily dependent upon the resistivity of the mud filtrate, containing essentially mud filtrate and any nondisplaceable fluids immediately surrounding the borehole; (2) a second narrow zone of relatively higher or lower resistivity, which is primarily dependent upon the resistivity of any displaced connate water, containing nondisplaceable hydrocarbons and connate water which has been forced from the first zone along with any displaceable hydrocarbons which may be present; and (3) a third zone of relatively high resistivity, concentric with the second zone and containing connate water and hydrocarbons in their pristine condition. Detection of a zone of relatively high resistivity, and in turn still another zone of high resistivity, is an indication of the presence of displaceable hydrocarbons and connate water.

The present invention, though not limited to the presence of a mud filtrate to create the foregoing described zones, is directed to the detection of displaceable hydrocarbons in earth formations under similar conditions.

Referring to FIGURE 1, the numeral 1 represents a sonde which is supported by cable 2 in borehole 3. Cable 2 is controlled and suspended by reel 4. Sonde 1 is a fluid-tight, cylindrical, non-magnetic container having a transmitter coil 5 connected through a conductor within cable 2, through split-ring 6 on reel 4, to variable current-generator 7. The output current from generator 7 is controlled by pulsator 8 to give a stepped wave pattern to the input current for coil 5. Variable current-generator 7 may be a combination of a Hewlett Packard Decade Counter that produces a step voltage pattern, and a cathode follower-amplifier whose impedance is matched to that of coil 5. The Decade Counter is driven by standard pulse-generator 8, the time base of which can be varied to suit the situation. Other types of variable current-generators and pulsators known to those skilled in the art may be used.

In operation, the varying, stepped, alternating current sent to transmitter coil 5 creates an expanding and collapsing magnetic field within earth formation 9. The depth of penetration of this magnetic field from borehole 3 is dependent on the magnitude of the alternating current being supplied to coil 5 at that instant. Since the input current is alternating, an expanding and collapsing magnetic field is generated adjacent to the borehole. The magnetic field set up in the formation causes an induced current which flows in a circular path around the borehole. The magnitude of this induced current is proportional to the resistivity of the formation 9 within the zone traversed by the magnetic field.

The induced current caused by the primary magnetic field establishes a second magnetic field, which causes a voltage to be induced across receiver-coil 10 in sonde 1. This induced voltage, being proportional to the secondary magnetic field, is also proportional to the induced current in the formation 9, and in turn to the resistivity of the formation. Because the transmitter current is being repeatedly swept or stepped over a predetermined fixed range, the voltage induced in receiver-coil 10 varies continuously, and at any given instant is dependent on the depth to which the magnetic field has penetrated into the formation. It is also proportional to the resistivity of the zone of the formation encompassed within the magnetic field.

The power output from receiver-coil 10 is transmitted through an insulated conductor in cable 2, slip-rings 11 on drum 4, and conductors 12, to amplifier 13 and oscilloscope 14. The various electrical leads between the remaining components are indicated by numerals 15, 16, 17, 18, 19, 20 and 21. Oscilloscope 14, by suitable calibration, registers the relationship between the induced current (proportional to resistivity) and the distance from the borehole. A permanent record of this relationship is obtained by photographing the pattern on the oscilloscope screen, according to well-known techniques. From the relationships obtained, the resistivity at any distance from the borehole can be determined and curves such as shown in FIGURE 2 plotted.

FIGURE 2 illustrates the types of relationships which can be determined from the pattern indicated on oscilloscope 14. The abscissas represent distances from the borehole and the ordinates represent resistivity.

Curve A is the type of curve obtained when formation 9 is initially completely (100%) saturated with fresh water of high resistivity and has been invaded by a mud filtrate having a lower resistivity. It can be seen from curve A that the resistivity uniformly increases from the low value of the filtrate in the invaded zone up to the high value of the fresh water in the zone which has not been penetrated. A formation in which this type of curve or resistivity pattern is obtained does not contain producible crude oil.

Curve B is the type of curve obtained when a formation which contains salt water of low resistivity and oil of high resistivity is invaded by a mud filtrate having the same resistivity as that represented by curve A. The minimum point on curve B, shown as being present at a distance of about 25 inches from the borehole, corresponds to a bank of salt water which has been pushed ahead of, and displaced by, the mud filtrate. When a curve of type B is obtained, there is a strong indication that the formation is a producible petroleum reservoir. This represents a specific example of the invention.

Curve C is the type of curve obtained when a formation which is saturated with salt water is invaded by a mud filtrate having the same resistivity as the filtrate of curve A. A curve of type C indicates the absence of oil.

It is seen from the foregoing description of the invention that the instant method and apparatus is not dependent on the necessity of measuring the specific resistivity of at least radial increments of the formations being considered. It is different from the prior art technique of using an alternating current of substantially constant frequency and amplitude, and does not necessitate analyzing a square wave as has been proposed in the prior art. Furthermore, the results are not dependent upon the comparison of a potential measured between a pair of spaced electrodes in contact with the earth formation with the potential drop across radial segments of the earth formation contacted thereby. Also, the apparatus avoids the necessity of compensating potentiometers and variable resistances commonly used in the prior art.

It is seen that by varying the magnitude of the current supplied to the transmitter coil 5, the depth of penetration of the ring of eddy currents generated is varied and controlled. In one embodiment of this invention, sonde 1 is lowered into borehole 3 and positioned opposite the formation to be examined. Then the transmitter current from 7 is pusated by pulsator 8 over a predetermined range necessary to cause a variation in the depth of penetration of the magnetic field from a few inches to several feet from the borehole. The signal received by coil 10 and amplified by amplifier 13 is measured by the oscilloscope 14 to obtain a plot of resistivity against depth of penetratration. The resulting plot is a direct pattern of the resistivity at varying distances from the borehole. If desired, sonde 1 can be re-positioned at different levels in the borehole, and the procedure repeated, in order to obtain a vertical as well as a horizontal log of the well.

In another embodiment of this invention, the magnitude of the transmitter current is varied over the same predetermined range, either continuously or step-wise in a repetitive or cyclic fashion, as the sonde is continuously raised or lowered in the borehole at a constant, relatively slow rate. The resulting response of receiver coil 10 is viewed on oscilloscope 14, which is synchronized with the repetitive frequency of the transmitter current. In this way, continuous logging of the borehole is obtained and plotting of individual points eliminated. Preferably, in either embodiment, the oscilloscope pattern is photographed to provide a permanent record.

As is well known to those skilled in this art, it is practically impossible to obtain a true measurement of the specific resistivity of an earth formation because of variations in the formation composition within any given stratum, leakage of current through the borehole, and interferences due to mechanical parts present in the borehole along with many other interfering factors. Accordingly, the term "resistivity" as used in this specification and in the claims will be understood to means the apparent resistivity as obtained through borehole measurements with electrical apparatus.

The invention has been illustrated by a specific apparatus and method as applied to the detection of displaceable hydrocarbons in an earth formation adjacent a borehole by measuring the apparent resistivity of the formation at gradually increasing depths under different frequencies or cycles of electrical impulse. Those skilled in this art will realize that the frequency of the alternating current and the repetitive frequency of the current amplitude variation may vary considerably, depending on the type of earth formation concerned, the sensitivity of the measuring circuit, the depth of penetrations attempted, etc. It should also be appreciated that many alterations may be made in the method and apparatus as disclosed without departing from the invention as claimed.

What is claimed is:

1. The method of determining the changes in resistivity of an earth formation with horizontal depth from a borehole which comprises establishing in a borehole a body of electrically conductive liquid, forcing the same conductive liquid into said formation, obtaining at least one indication of the resistivity of said earth formation at a circumferential area immediately adjacent said borehole by inducing an electromagnetic oscillation into said area and detecting the resistivity of said first area in relation to said induced electromagnetic oscillation, increasing the magnitude of said oscillation to cause the induced field to penetrate further into a second area of said earth formation, detecting the resistivity of said second area of penetration, and continuing the increases in magnitude of said oscillation and the corresponding depth of penetration while detecting the resistivity at said increased depths, until said resistivity becomes substantially constant.

2. The method in accordance with claim 1 in which said measurements are made intermittently along said length of said borehole.

3. The method in accordance with claim 1 in which said measurements are made continuously along said length of said borehole.

4. The mehtod of determining the changes in resistivity of an earth formation with horizontal depth from a borehole which comprises inducing an electromagnetic oscillation within a circumferential area of said formation immediately adjacent said borehole by passing an alternating current therethrough, controlling the depth of penetration by the magnitude of said alternating current, detecting the magnitude of said induced oscillation as a function of the resistivity of said first area of the formation, registering the relationship between the magnitude of said induced current and the distance of penetration from the borehole, increasing the magnitude of said oscillation to cause the induced field to penetrate further into a second circumferential area of said formation, detecting the magnitude of said second induced oscillation as a function of the resistivity of said second area of the formation, registering the relationship between the magnitude of said second induced current and the distance of penetration from the borehole, and continuing the increases in magnitude of said oscillation and the corresponding depth of penetration while registering the relationship between the respective magnitudes of said subsequently induced currents until said resistivity becomes substantially constant.

5. The method in accordance with claim 4 in which said measurements are made intermittently along said length of said borehole.

6. The method in accordance with claim 4 in which said measurements are made continuously along said length of said borehole.

7. The method of determining the changes in resistivity of an earth formation with horizontal depth from a borehole which comprises inducing by means of a stepped alternating current an expanding and collapsing magnetic field within a first circumferential area of said formation immediately adjacent said borehole, controlling the depth of penetration of said magnetic field by the magnitude of said alternating current, said expanding and collapsing magnetic field thereby creating an induced current within and through said first circumferential area which is proportional to the resistivity of said first circumferential area, detecting the secondary magnetic field created by said circumferentially induced current as an induced voltage proportional thereto, amplifying said induced voltage to register the relationship between the induced voltage and the distance from said borehole, increasing the magnitude of said stepped alternating current whereby to create a second expanding and collapsing magnetic field within a second circumferential area of said formation at a distance further from said borehole, said second magnetic field creating a second induced current within and through said second circumferential area which is proportional to the resistivity of same, detecting the secondray magnetic field created by said circumferentially induced current as an induced voltage proportional thereto, amplifying said induced voltage to register the relationship between the induced voltage and the distance from said borehole, increasing the magnitude of said stepped alternating current and the corresponding depth of penetration while continuing to register the relationship between the subsequently induced voltages and the distance from the borehole until said resistivity becomes substantially constant, and registering the point in said relationship where the resistivtiy changes abruptly.

8. The method in accordance with claim 7 in which the point in said relationship is registered where said resistivity is a minimum.

References Cited in the file of this patent

UNITED STATES PATENTS

| | | |
|---|---|---|
| 2,220,070 | Aiken | Nov. 5, 1940 |
| 2,220,788 | Lohman | Nov. 5, 1940 |
| 2,617,852 | Waters | Nov. 11, 1952 |
| 2,657,380 | Donaldson | Oct. 27, 1953 |
| 2,660,703 | Herbold | Nov. 24, 1953 |
| 2,754,475 | Norelius | July 10, 1956 |
| 2,782,364 | Schuler et al. | Feb. 19, 1957 |
| 2,790,138 | Poupon | Apr. 23, 1957 |
| 2,884,589 | Campbell | Apr. 28, 1959 |